US012693849B2

(12) United States Patent
Maruyama et al.

(10) Patent No.: US 12,693,849 B2
(45) Date of Patent: Jul. 28, 2026

(54) IN-VEHICLE APPARATUS

(71) Applicant: SUBARU CORPORATION, Tokyo (JP)

(72) Inventors: Shun Maruyama, Tokyo (JP); Osamu Okada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 237 days.

(21) Appl. No.: 18/628,131

(22) Filed: Apr. 5, 2024

(65) Prior Publication Data

US 2024/0345826 A1     Oct. 17, 2024

(30) Foreign Application Priority Data

Apr. 13, 2023     (JP) ................................. 2023-065307

(51) Int. Cl.
| | |
|---|---|
| *G06F 8/65* | (2018.01) |
| *H04W 4/48* | (2018.01) |
| *H04W 76/10* | (2018.01) |

(52) U.S. Cl.
CPC ................ *G06F 8/65* (2013.01); *H04W 4/48* (2018.02); *H04W 76/10* (2018.02)

(58) Field of Classification Search
None
See application file for complete search history.

(56) References Cited

U.S. PATENT DOCUMENTS

| | | | | |
|---|---|---|---|---|
| 11,475,428 B2 * | 10/2022 | Mimassi | ............... | H04L 67/306 |
| 12,530,681 B1 * | 1/2026 | Foster | ................ | G06Q 20/3829 |
| 2015/0347121 A1 | 12/2015 | Harumoto | | |
| 2015/0363210 A1 * | 12/2015 | Wehrman | .................. | G06F 8/65 |
| | | | | 701/31.5 |
| 2016/0202966 A1 * | 7/2016 | Vangelov | ................ | H04L 67/12 |
| | | | | 717/172 |
| 2016/0210131 A1 * | 7/2016 | Vangelov | ................. | H04L 67/12 |
| 2019/0313246 A1 * | 10/2019 | Nix | ........................ | H04L 9/3247 |
| 2020/0174771 A1 * | 6/2020 | Camacho | ............ | G06F 16/9535 |
| 2021/0141631 A1 * | 5/2021 | Harata | ...................... | G06F 8/65 |
| 2023/0376997 A9 * | 11/2023 | Heeter | .................... | G06F 21/78 |

FOREIGN PATENT DOCUMENTS

| | | | |
|---|---|---|---|
| CN | 109766108 A | * | 5/2019 |
| WO | 2014087613 A1 | | 6/2014 |

* cited by examiner

*Primary Examiner* — Philip Wang
(74) *Attorney, Agent, or Firm* — TROUTMAN PEPPER LOCKE LLP

(57)     ABSTRACT

An in-vehicle apparatus includes a communicator, a display, and a processor. The communicator communicates with a first portable device. The display displays a pattern image including first setting data indicating a connection setting to a server. The processor requests the first portable device communicably coupled to the communicator to establish a communication connection to the server based on the first setting data acquired by capturing the pattern image and download a data file from the server.

12 Claims, 11 Drawing Sheets

IN-VEHICLE APPARATUS

CROSS-REFERENCE TO RELATED APPLICATIONS

The present application claims priority from Japanese Patent Application No. 2023-065307 filed on Apr. 13, 2023, the entire contents of which are hereby incorporated by reference.

BACKGROUND

The disclosure relates to an in-vehicle apparatus to be applied to a vehicle.

In-vehicle apparatuses are often subjected to software updates. For example, International Patent Application Publication WO2014/087613A1 discloses a technique in which a smartphone downloads updating data that is suitable for a vehicle from a server apparatus and transfers the downloaded data to an in-vehicle apparatus.

SUMMARY

An aspect of the disclosure provides an in-vehicle apparatus to be applied to a vehicle. The in-vehicle apparatus includes a communicator, a display, and a processor. The communicator is configured to communicate with a first portable device. The display is configured to display a pattern image including first setting data indicating a connection setting to a server. The processor is configured to request the first portable device communicably coupled to the communicator to establish a communication connection to the server based on the first setting data acquired by capturing the pattern image and download a data file from the server.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

DETAILED DESCRIPTION

Figure 1:
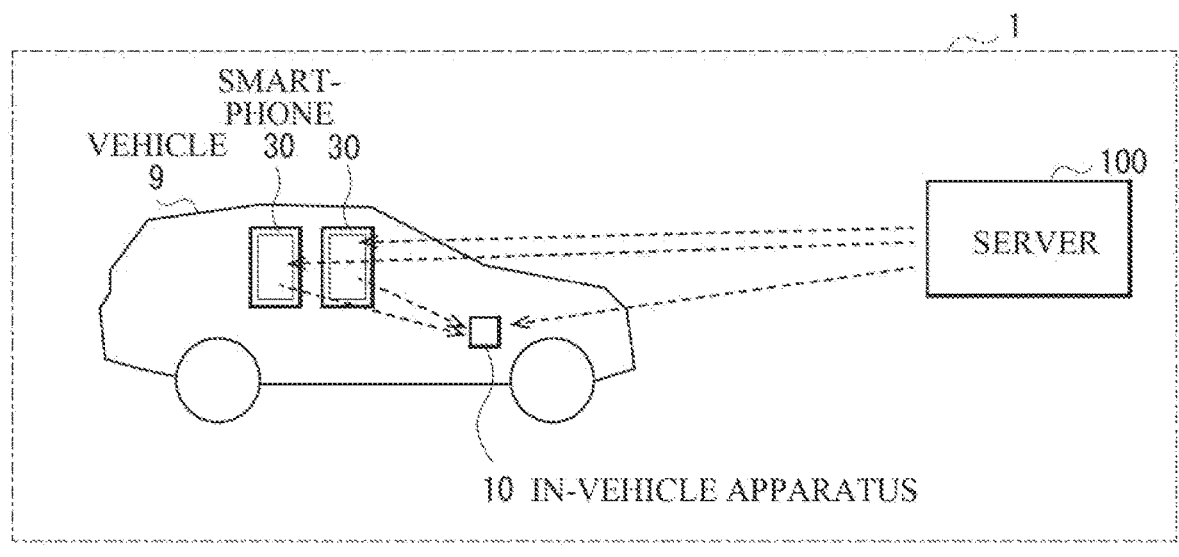
FIG. 1 is a diagram illustrating a configuration example of a communication system according to an example embodiment of the disclosure.

There is a general demand for an electronic device with high user convenience, and an in-vehicle apparatus with high user convenience has been expected.

It is desirable to provide an in-vehicle apparatus with enhanced user convenience.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

FIG. 1 illustrates a configuration example of a communication system 1 according to an example embodiment. The communication system 1 may include a vehicle 9 and a server 100.

The vehicle 9 may be, for example, an automobile. The vehicle 9 includes an in-vehicle apparatus 10. The in-vehicle apparatus 10 is configured to control travel of the vehicle 9. The in-vehicle apparatus 10 may be configured to communicate with the server 100 via the Internet (not illustrated) through mobile communication such as 4th generation (4G) mobile communication or 5th generation (5G) mobile communication, or through wireless network communication such as wireless local area network (LAN) communication.

A smartphone 30 may be owned by an occupant of the vehicle 9. In this example, there may be multiple smartphones 30 inside the vehicle 9. In FIG. 1, two smartphones 30 are illustrated. Each of the smartphones 30 may be configured to communicate with the in-vehicle apparatus 10 through, for example, wireless network communication such as wireless LAN communication. Further, the smartphone 30 may be configured to communicate with the server 100 via the Internet (not illustrated) through, for example, mobile-phone communication such as 4G mobile-phone communication or 5G mobile-phone communication or through wireless network communication such as wireless LAN communication.

The server 100 may be coupled to the Internet (not illustrated). In this example, the server 100 may manage software used in the vehicle 9. When the software used in the vehicle 9 is upgraded, for example, the server 100 may send the in-vehicle apparatus 10 a notification indicating that updating software is in the server 100 and may transmit a data file of the updating software to the smartphone 30 in response to a request from the smartphone 30.

In the communication system 1 having such a configuration, the in-vehicle apparatus 10 displays a QR code (registered trademark) when receiving, from the server 100, the notification indicating that the updating software adapted to update the software used in the in-vehicle apparatus 10 is in the server 100. The QR code may include data indicating a connection setting to the server 100 and data indicating a connection setting to the in-vehicle apparatus 10. For example, each of the smartphones 30 may acquire the connection setting to the server 100 and the connection setting to the in-vehicle apparatus 10 by capturing the QR code in response to an operation of the occupant who is the owner of the smartphone 30. Thereafter, based on the connection setting to the in-vehicle apparatus 10, the smartphone 30 may establish a communication connection to the in-vehicle apparatus 10. Further, each of the smartphones 30 may send the in-vehicle apparatus 10 data on a communication speed of the smartphone 30 in the communication between the smartphone 30 and the server 100. Based on the communication speeds of the smartphones 30, for example, the in-vehicle apparatus 10 may sequentially assign respective data files included in the updating software to the smartphones 30. The smartphones 30 may each establish a communication connection to the server 100 based on the connection setting to the server 100 and may sequentially download the assigned data files from the server 100. Thereafter, the smartphones 30 may transfer the downloaded data files to the in-vehicle apparatus 10. The in-vehicle apparatus 10 may update the software by performing an install operation based on the data files transferred from the smartphones 30. As described above, the communication system 1 may download the software using the QR code. It is therefore possible to enhance the user convenience.

Figure 2:
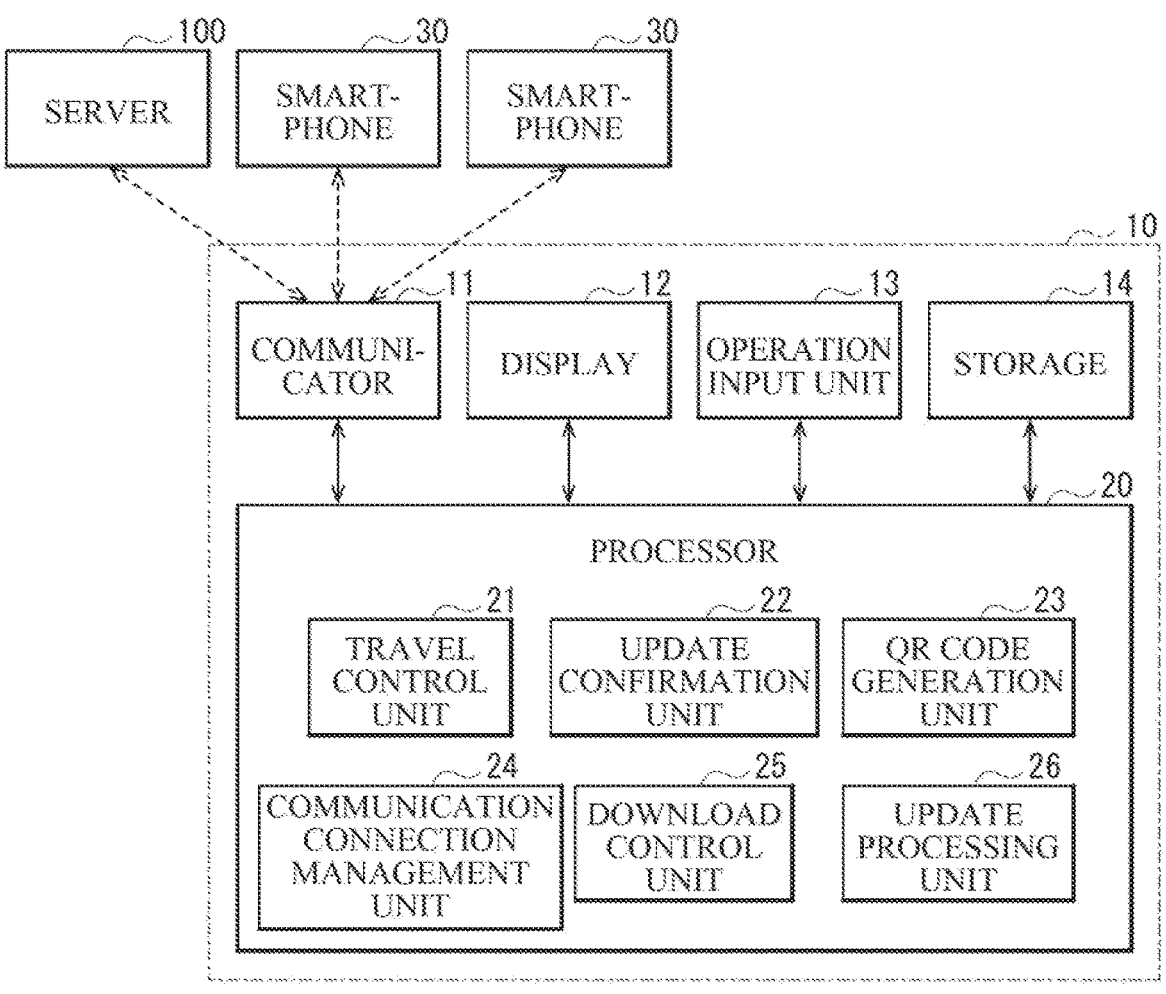
FIG. 2 is a block diagram illustrating a configuration example of an in-vehicle apparatus illustrated in FIG. 1.

FIG. 2 illustrates a configuration example of the in-vehicle apparatus 10. In FIG. 2, two smartphones 30 and the server 100 are illustrated. The in-vehicle apparatus 10 may include a communicator 11, a display 12, an operation input unit 13, a storage 14, and a processor 20.

The communicator 11 may include, for example, one or more communication devices. The communicator 11 may be configured to communicate with the server 100 via the Internet (not illustrated) through mobile communication or wireless network communication, for example. The communicator 11 may be further configured to communicate with the smartphones 30 through wireless network communication, for example.

The display 12 may include a display panel such as a liquid crystal display panel or an organic electroluminescent (EL) display panel. The display 12 may be configured to display information to be notified to the occupant or a QR code to be described later.

The operation input unit 13 may include, for example, a touch sensor and various buttons. The operation input unit 13 may be configured to receive an operational input performed by the occupant.

The storage 14 may include a non-volatile storage device such as a flash memory or a hard disk drive (HDD). The storage 14 may be configured to store software and various kinds of data.

The processor 20 may include, for example, one or more processing units and one or more semiconductor memories. The processor 20 may be configured to control the travel of the vehicle 9. The processor 20 may perform a process by executing software installed in the in-vehicle apparatus 10.

The processor 20 may include a travel control unit 21, an update confirmation unit 22, a QR code generation unit 23, a communication connection management unit 24, a download control unit 25, and an update processing unit 26.

The travel control unit 21 may be configured to control the travel of the vehicle 9 by controlling operations of a power source such as a motor or an engine, a steering device, and a braking device of the vehicle 9, for example. For instance, the travel control unit 21 may control the travel of the vehicle 9 based on a driving operation performed by a driver using a steering wheel, an accelerator pedal, a brake pedal, or the like.

The update confirmation unit 22 may be configured to confirm whether the updating software adapted to update the software used in the in-vehicle apparatus 10 is in the server 100. For example, the update confirmation unit 22 may confirm whether the updating software is in the server 100 by confirming whether the notification indicating that the updating software is in the server 100 has been received from the server 100. The notification indicating that t the updating software is in the server 100 may include data on the names of the data files of the updating software and data on the file sizes of the data files.

The QR code generation unit 23 may be configured to generate a QR code to be displayed on the display 12. The QR code may be a pattern image including the data indicating the connection setting to the server 100 and the data indicating the connection setting to the in-vehicle apparatus 10. The data indicating the connection setting to the server 100 may be data indicating the connection setting to be used by the smartphone 30 to establish the communication connection to the server 100. The data indicating the connection setting to the server 100 may include, for example, a uniform resource locator (URL) of the server 100, a username, a password, and the like. The data indicating the connection setting to the in-vehicle apparatus 10 may be data indicating the connection setting to be used by the smartphone 30 to establish the communication connection to the in-vehicle apparatus 10. The data indicating the connection setting to the in-vehicle apparatus 10 may include, for example, an identifier, a password, and the like of the in-vehicle apparatus 10. Accordingly, the smartphone 30 may be configured to capture the QR code and acquire the connection setting to the server 100 and the connection setting to the in-vehicle apparatus 10 based on the result of capturing.

The communication connection management unit 24 may be configured to manage the communication connection of the smartphone 30 to the in-vehicle apparatus 10. For example, the communication connection management unit 24 may manage the smartphone 30 establishing the communication connection to the in-vehicle apparatus 10 in association with the communication speed of the smartphone 30 in the communication between the smartphone 30 and the server 100. The communication speed may be, for example, an actual communication speed of the smartphone 30 obtained upon actual communication between the smartphone 30 and the server 100, or a communication speed estimated based on a standard of wireless communication used for the communication between the smartphone 30 and the server 100. Examples of the standard of wireless communication may include 4G, 5G and wireless LAN. For example, the communication connection management unit 24 may estimate that the communication speed of the wireless LAN is higher than or equal to the communication speed of 4G. Further, for example, the communication connection management unit 24 may estimate that the communication speed of 5G is higher than the communication speed of the wireless LAN.

The download control unit 25 may be configured to control an operation performed by the smartphone 30 to download the data file from the server 100 when the smartphone 30 establishes the communication connection to the in-vehicle apparatus 10. For example, upon the communication between the multiple smartphones 30 and the in-vehicle apparatus 10, the download control unit 25 may sequentially assign the respective data files included in the updating software to the smartphones 30 based on the communication speeds of the smartphones 30. For example, the download control unit 25 may assign a data file having a large file size to the smartphone 30 having a high communication speed, and a data file having a small file size to the smartphone 30 having a low communication speed. Further, the download control unit 25 may be configured to control an operation adapted to transfer the data file downloaded by the smartphone 30 to the in-vehicle apparatus 10.

The update processing unit 26 may be configured to update the software used in the in-vehicle apparatus 10 by performing the installation operation based on the plurality of data files transferred from the smartphones 30.

Figure 3:
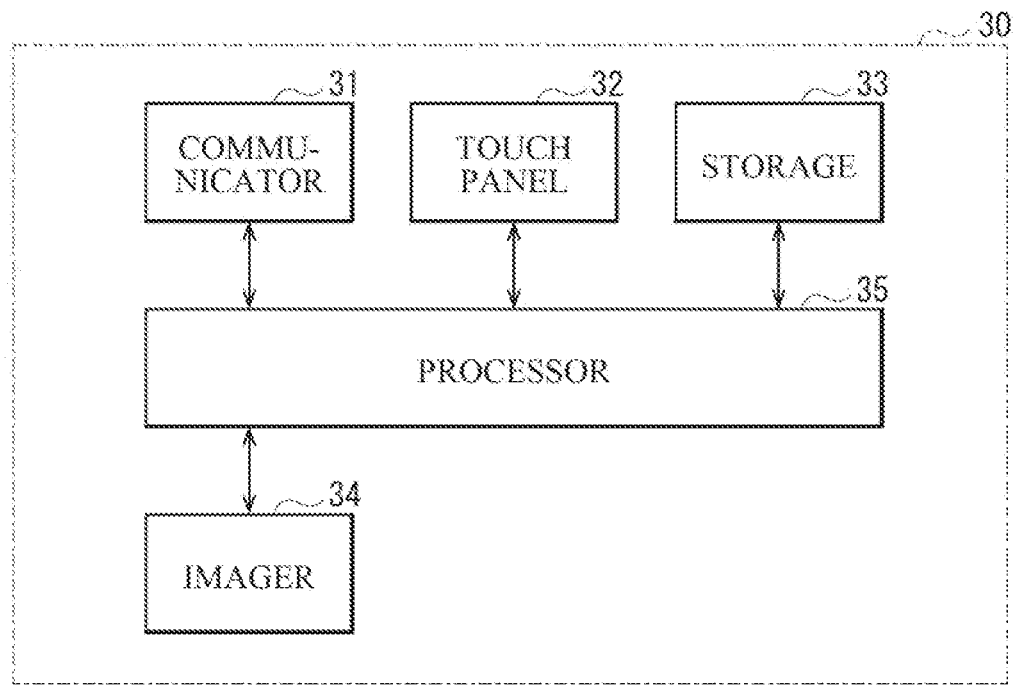
FIG. 3 is a block diagram illustrating a configuration example of a smartphone illustrated in FIG. 1.

FIG. 3 illustrates a configuration example of the smartphone 30. The smartphone 30 may include a communicator 31, a touch panel 32, a storage 33, an imager 34, and a processor 35.

The communicator 31 may include, for example, one or more communication devices. The communicator 31 may be configured to communicate with the server 100 via the Internet (not illustrated) through mobile communication or wireless network communication, for example. The communicator 31 may be further configured to communicate with the in-vehicle apparatus 10 through wireless network communication, for example.

The touch panel 32 may be configured to display information and receive an operational input performed by the user who is the occupant.

The storage 33 may include a non-volatile storage device such as a flash memory. The storage 33 may be configured to store software and various kinds of data.

The imager 34 may include a complementary metal-oxide semiconductor (CMOS), for example. The imager 34 may be configured to capture an image of a subject. In this example, the imager 34 may be configured to capture the QR code displayed on the display 12 of the in-vehicle apparatus 10.

The processor 35 may include, for example, one or more processing units and one or more semiconductor memories. The processor 35 may be configured to control an operation of the smartphone 30.

In one embodiment, the communicator 11 may serve as a "communicator". In one embodiment, the display 12 may serve as a "display". In one embodiment, the operation input unit 13 may serve as an "operation input unit". In one embodiment, the processor 20 may serve as a "processor". In one embodiment, the server 100 may serve as a "server".

Next, operations and workings of the communication system 1 according to the example embodiment are described.

First, an operation of the communication system 1 is described with reference to FIGS. 1 to 3. When the server 100 sends the in-vehicle apparatus 10 the notification indicating that the updating software is in the server 100, the display 12 of the in-vehicle apparatus 10 may display the QR code. For example, each of the smartphones 30 may acquire the connection setting to the server 100 and the connection setting to the in-vehicle apparatus 10 by capturing the QR code in response to an operation of the occupant who is the owner of the smartphone 30, and may establish the communication connection to the in-vehicle apparatus 10 based on the connection setting to the in-vehicle apparatus 10. Further, each of the smartphones 30 may send the in-vehicle apparatus 10 the data on the communication speed of the smartphone 30 in the communication between the smartphone 30 and the server 100. Based on the communication speeds of the smartphones 30, for example, the in-vehicle apparatus 10 may sequentially assign the respective data files included in the updating software to the smartphones 30. The smartphones 30 may each establish the communication connection to the server 100 based on the connection setting to the server 100 and may sequentially download the assigned data files from the server 100. Thereafter, the smartphones 30 may transfer the downloaded data files to the in-vehicle apparatus 10. The in-vehicle apparatus 10 may update the software by performing the installation operation based on the data files transferred from the smartphones 30.

Figure 4:
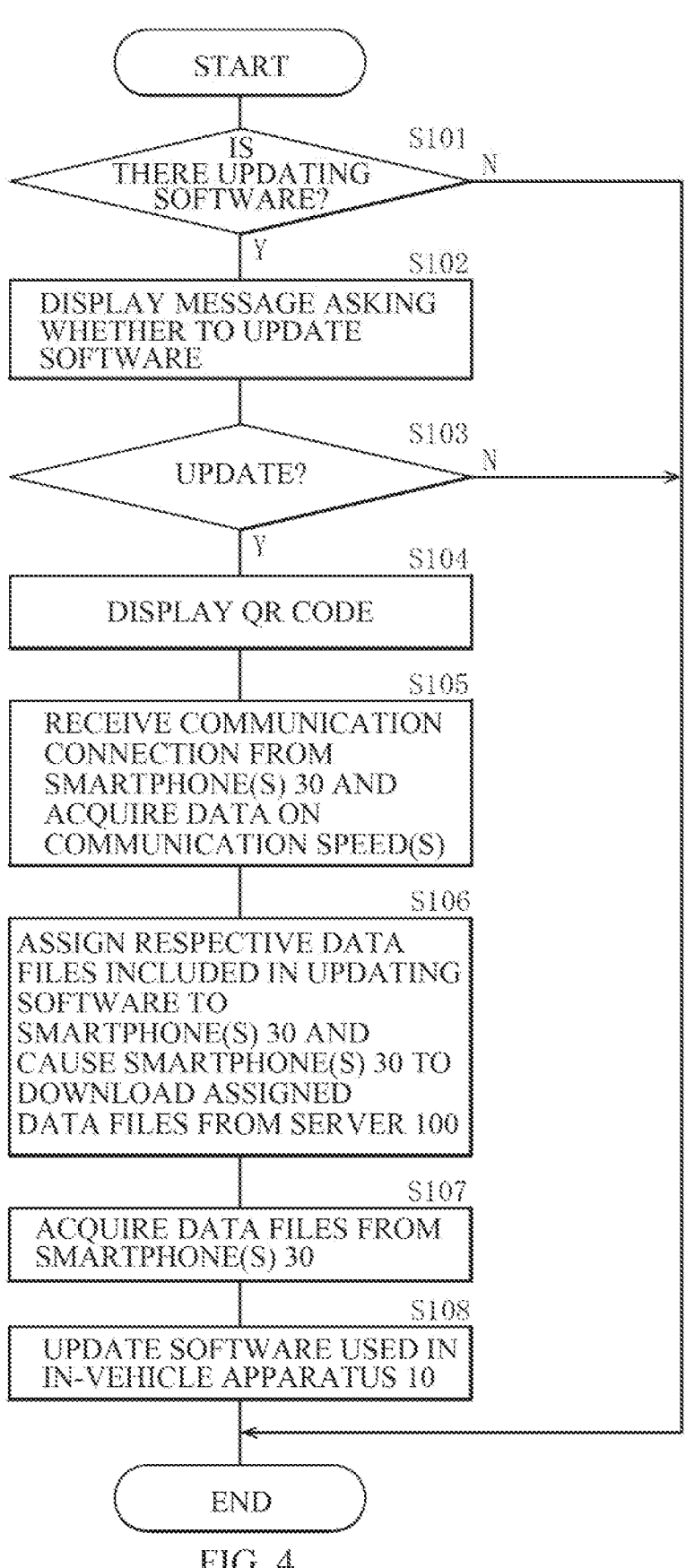
FIG. 4 is a flowchart of an exemplary operation of the in-vehicle apparatus illustrated in FIG. 2.

FIG. 4 illustrates an exemplary operation of the in-vehicle apparatus 10. For example, when the vehicle 9 is started up, the in-vehicle apparatus 10 may perform the following process.

First, the update confirmation unit 22 of the in-vehicle apparatus 10 may confirm whether the notification indicating that the updating software adapted to update the software used in the in-vehicle apparatus 10 is in the server 100 has been received from the server 100 (Step S101). When no updating software is in the server 100 (Step S101: N), the process may be terminated.

When the updating software is in the server 100 (Step S101: Y), the display 12 may display a message asking the occupant whether to update the software used in the in-vehicle apparatus 10, based on a command from the update confirmation unit 22 (Step S102).

When confirming the message displayed on the display 12, the occupant may operate the operation input unit 13 of the in-vehicle apparatus 10 to instruct whether to update the software. When the operation input unit 13 receives an instruction not to update the software (Step S103: N), the process may be terminated.

When the operation input unit 13 receives an instruction to update the software (Step S103: Y), the QR code generation unit 23 may generate the QR code including the data indicating the connection setting to the server 100 and the data indicating the connection setting to the in-vehicle apparatus 10, and the display 12 may display the QR code (Step S104).

When confirming the QR code displayed on the display 12, the occupant may operate the touch panel 32 of the smartphone 30 to capture the QR code. In response to the operation by the occupant, the imager 34 of the smartphone 30 may capture the QR code. When there is one occupant in the vehicle 9, the smartphone 30 of the occupant may capture the QR code, for example. When there are multiple occupants in the vehicle 9, the smartphone 30 of each of the occupants may capture the QR code, for example. The QR code may include the data indicating the connection setting to the server 100 and the data indicating the connection setting to the in-vehicle apparatus 10. Thus, based on the QR code, the processor 35 of the smartphone 30 may acquire the connection setting to the server 100 and the connection setting to the in-vehicle apparatus 10. Thereafter, the communicator 31 of the smartphone 30 may establish the communication connection to the in-vehicle apparatus 10 based on the connection setting to the in-vehicle apparatus 10.

The communication connection management unit 24 may receive the communication connection from the one or more smartphones 30 and may acquire the data on the communication speed of each of the one or more smartphones 30 in the communication with the server 100 (Step S105). Thereafter, the communication connection management unit 24 may manage the smartphone 30 establishing the communication connection to the in-vehicle apparatus 10 in association with the communication speed of the smartphone 30.

Next, the download control unit 25 may sequentially assign the respective data files included in the updating software to the one or more smartphones 30, and may cause the one or more smartphones 30 to sequentially download the assigned date files from the server 100 (Step S106). When the multiple smartphones 30 are communicating with the in-vehicle apparatus 10, the download control unit 25 may assign the respective data files to the smartphones 30 based on the communication speeds of the smartphones 30 acquired in Step S105, for example. The notification which indicates that the updating software is in the server 100 and which is received by the in-vehicle apparatus 10 in Step S101 may include the data on the names of the data files of the updating software and the data on the file sizes of the data files. Based on these pieces of data, the download control unit 25 may assign a data file having a large file size to the smartphone 30 having a high communication speed, and a data file having a small file size to the smartphone 30 having a low communication speed, for example. In this case, the smartphone 30 having the high communication speed may download the data file having the large file size, and the smartphone 30 having the low communication speed may download the data file having the small file size.

Next, the download control unit 25 may cause the one or more smartphones 30 to transfer the plurality of downloaded data files, thereby acquiring the plurality of data files from the one or more smartphones 30 (Step S107). In this way, the in-vehicle apparatus 10 may acquire the updating software.

Thereafter, the update processing unit 26 may update the software used in the in-vehicle apparatus 10 by performing the installation operation based on the data files transferred from the smartphones 30 (Step S108).

Thereafter, the process may be terminated.

Next, an exemplary operation of the communication system 1 is described in detail with reference to some example cases.

Described first is Case C1 in which one smartphone 30 (smartphone 30A) establishes the communication connection to the in-vehicle apparatus 10.

Figure 5A:
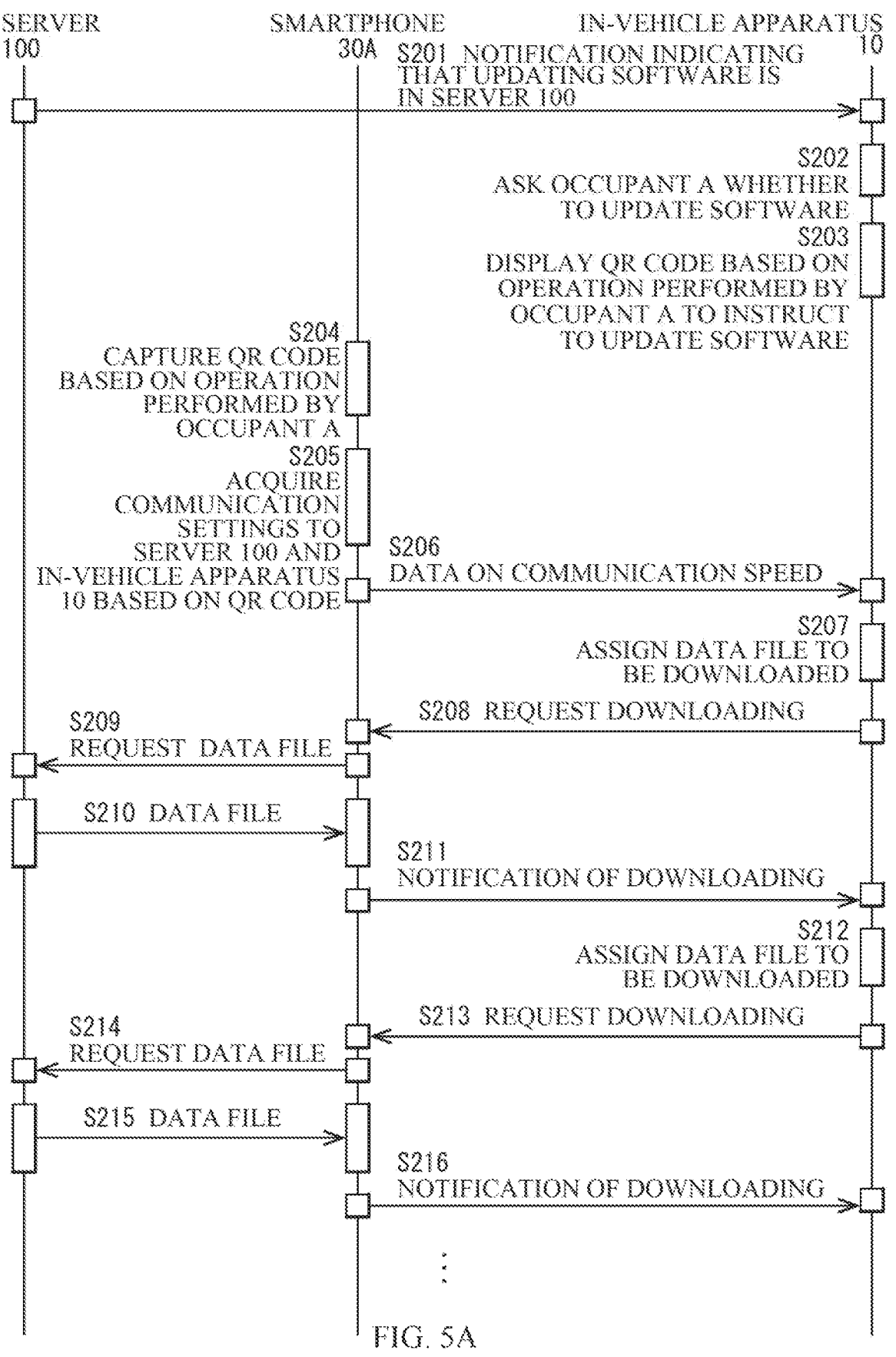
FIG. 5A is a sequence diagram illustrating an exemplary operation of the communication system illustrated in FIG. 1.
Figure 5B:
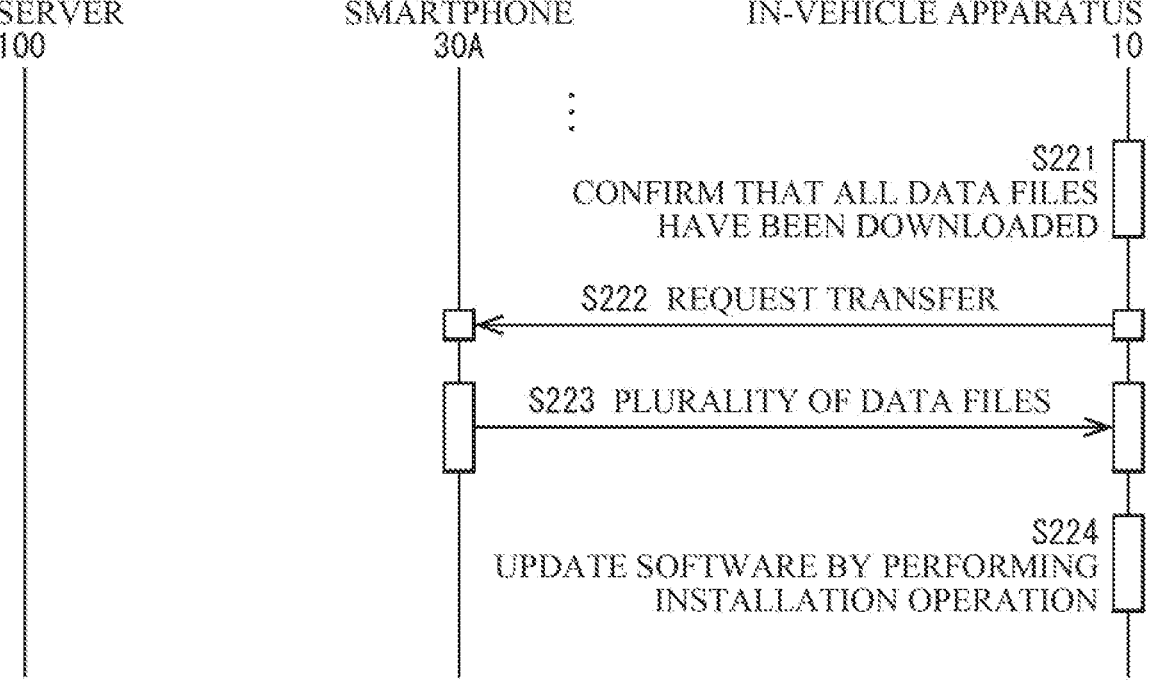
FIG. 5B is another sequence diagram illustrating an exemplary operation of the communication system illustrated in FIG. 1.

FIGS. 5A and 5B each illustrate an exemplary operation of the communication system 1 in Case C1.

First, when the software used in the vehicle 9 is upgraded, for example, the server 100 may send the in-vehicle apparatus 10 the notification indicating that the updating software is in the server 100 (Step S201). The communicator 11 of the in-vehicle apparatus 10 may receive the notification indicating that the updating software is in the server 100, and the update confirmation unit 22 may confirm that the notification has been received.

Next, based on the command from the update confirmation unit 22, the display 12 of the in-vehicle apparatus 10 may display a message asking an occupant A whether to update the software used in the in-vehicle apparatus 10 (Step S202). In this example, the occupant A may perform an operation instructing to update the software using the operation input unit 13 of the in-vehicle apparatus 10. Based on the operation performed by the occupant A to instruct to update the software, the QR code generation unit 23 of the in-vehicle apparatus 10 may generate a QR code, and the display 12 may display the QR code (Step S203).

Based on an operation performed by the occupant A using the touch panel 32 of the smartphone 30A, the imager 34 of the smartphone 30A may capture the QR code displayed on the display 12 of the in-vehicle apparatus 10 (Step S204). Based on the captured QR code, the processor 35 of the smartphone 30A may acquire the connection setting to the server 100 and the connection setting to the in-vehicle apparatus 10 (Step S205). Thereafter, the communicator 31 of the smartphone 30A may establish the communication connection to the in-vehicle apparatus 10 based on the connection setting to the in-vehicle apparatus 10, and may send the data on the communication speed of the smartphone 30A in the communication with the server 100 (Step S206). The communicator 11 of the in-vehicle apparatus 10 may receive the data on the communication speed. The communication connection management unit 24 may manage the smartphone 30A in association with the communication speed of the smartphone 30A.

Next, the download control unit 25 of the in-vehicle apparatus 10 may assign one of the data files included in the updating software to the smartphone 30A (Step S207). Thereafter, the in-vehicle apparatus 10 may request the smartphone 30A to download the assigned data file (Step S208).

The smartphone 30A may establish the communication connection to the server 100 based on the connection setting to the server 100 and may request the server 100 to transmit the assigned data file (Step S209). In response to the request from the smartphone 30A, the server 100 may transmit the data file assigned to the smartphone 30A (Step S210). In this way, the smartphone 30A may download the data file assigned in Step S207 from the server 100. Thereafter, the smartphone 30A may send the in-vehicle apparatus 10 a notification indicating that the assigned data file has been downloaded (Step S211).

The communication system 1 may repeat the process including Step S207 to Step S211 until the smartphone 30A downloads all the data files included in the updating software (see Steps S212 to S216, for example).

Thereafter, the download control unit 25 of the in-vehicle apparatus 10 may confirm that the smartphone 30A has downloaded all the data files included in the updating software (Step S221). Thereafter, the download control unit 25 may request the smartphone 30A to transfer all the downloaded data files (Step S222). In response to the request from the in-vehicle apparatus 10, the smartphone 30A may transfer all the downloaded data files to the in-vehicle apparatus 10 (Step S223). The communicator 11 of the in-vehicle apparatus 10 may receive these data files.

Thereafter, the update processing unit 26 of the in-vehicle apparatus 10 may update the software used in the in-vehicle apparatus 10 by performing the installation operation based on the data files transferred from the smartphone 30A (Step S224).

Thereafter, the process may be terminated. In one embodiment, the smartphone 30A may serve as a "first portable device".

Described next is Case C2 in which two smartphones 30 (smartphones 30A and 30B) establish the communication connection to the in-vehicle apparatus 10 at substantially the same time.

Figure 6A:
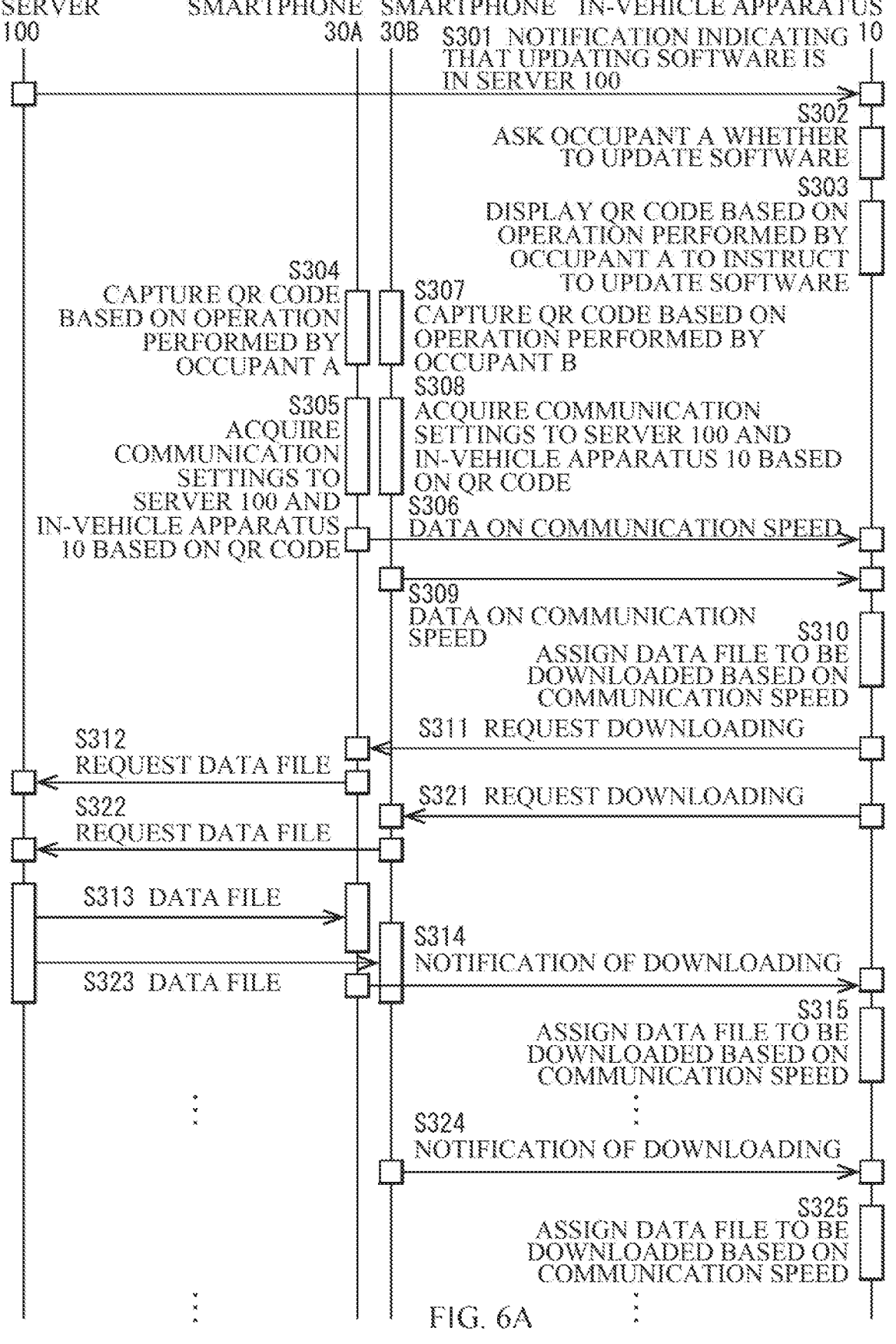
FIG. 6A is another sequence diagram illustrating an exemplary operation of the communication system illustrated in FIG. 1.
Figure 6B:
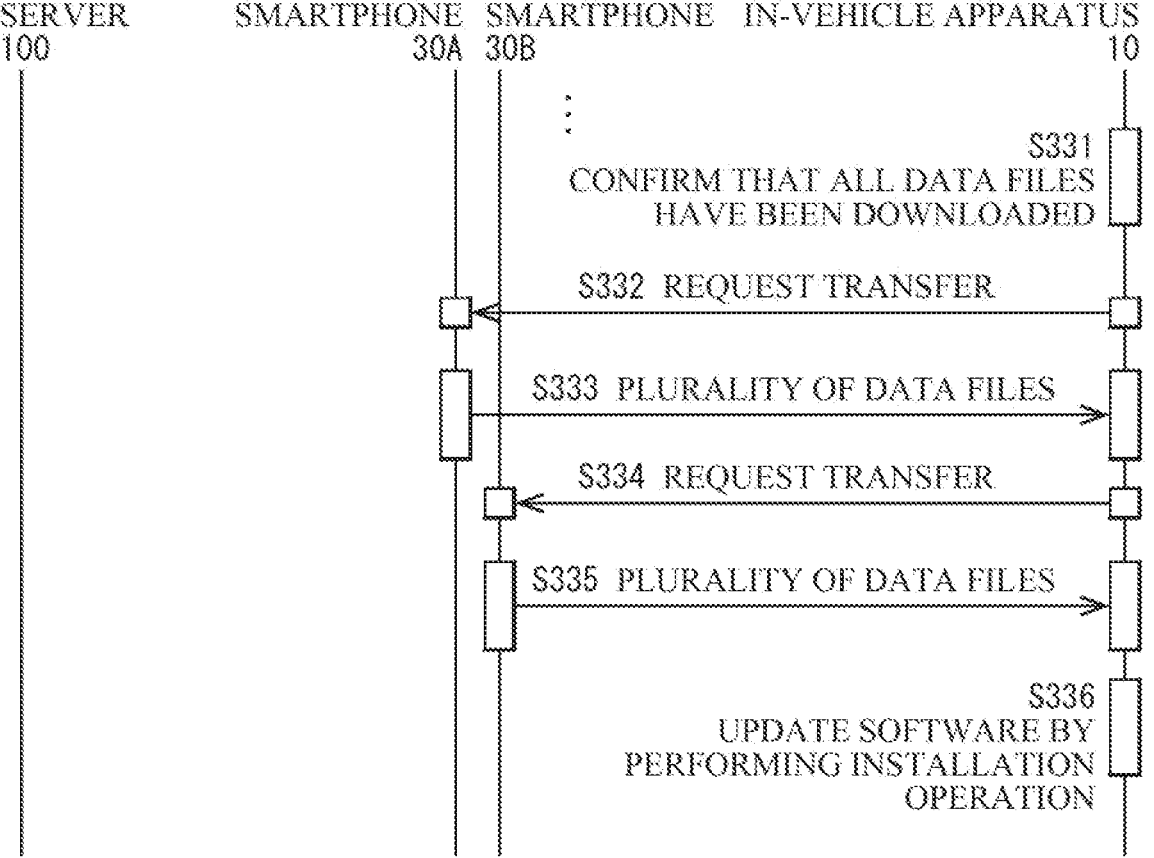
FIG. 6B is another sequence diagram illustrating an exemplary operation of the communication system illustrated in FIG. 1.

FIGS. 6A and 6B each illustrate an exemplary operation of the communication system 1 in Case C2.

First, when the software used in the vehicle 9 is upgraded, for example, the server 100 may send the in-vehicle apparatus 10 the notification indicating that the updating software is in the server 100 (Step S301). The communicator 11 of the in-vehicle apparatus 10 may receive the notification indicating that the updating software is in the server 100, and the update confirmation unit 22 may confirm that the notification has been received.

Next, based on the command from the update confirmation unit 22, the display 12 of the in-vehicle apparatus 10 may display the message asking the occupant A whether to update the software used in the in-vehicle apparatus 10 (Step S302). In this example, the occupant A may perform the operation instructing to update the software using the operation input unit 13 of the in-vehicle apparatus 10. Based on the operation performed by the occupant A to instruct to update the software, the QR code generation unit 23 of the in-vehicle apparatus 10 may generate a QR code, and the display 12 may display the QR code (Step S303).

Based on the operation performed by the occupant A using the touch panel 32 of the smartphone 30A, the imager 34 of the smartphone 30A may capture the QR code displayed on the display 12 of the in-vehicle apparatus 10 (Step S304). Based on the captured QR code, the processor 35 of the smartphone 30A may acquire the connection setting to the server 100 and the connection setting to the in-vehicle apparatus 10 (Step S305). Thereafter, the communicator 31 of the smartphone 30A may establish the communication connection to the in-vehicle apparatus 10 based on the connection setting to the in-vehicle apparatus 10, and may send the data on the communication speed of the smartphone 30A in the communication with the server 100 (Step S306). The communicator 11 of the in-vehicle apparatus 10 may receive the data on the communication speed. The communication connection management unit 24 may manage the smartphone 30A in association with the communication speed of the smartphone 30A.

Likewise, based on an operation performed by an occupant B using the touch panel 32 of the smartphone 30B, the imager 34 of the smartphone 30B may capture the QR code displayed on the display 12 of the in-vehicle apparatus 10 (Step S307). Based on the captured QR code, the processor 35 of the smartphone 30B may acquire the connection setting to the server 100 and the connection setting to the in-vehicle apparatus 10 (Step S308). Thereafter, the communicator 31 of the smartphone 30B may establish the communication connection to the in-vehicle apparatus 10 based on the connection setting to the in-vehicle apparatus 10, and may send the data on the communication speed of the smartphone 30B in the communication with the server 100 (Step S309). The communicator 11 of the in-vehicle apparatus 10 may receive the data on the communication speed. The communication connection management unit 24 may manage the smartphone 30B in association with the communication speed of the smartphone 30B.

Next, the download control unit 25 of the in-vehicle apparatus 10 may assign one of the data files included in the updating software to each of the smartphones 30A and 30B based on the communication speeds of the smartphones 30A and 30B (Step S310). When the communication speed of the smartphone 30A is higher than that of the smartphone 30B, for example, the download control unit 25 may assign a data file having a large file size to the smartphone 30A, and a data file having a small file size to the smartphone 30B. Thereafter, the in-vehicle apparatus 10 may request the smartphone 30A to download the assigned data file (Step S311) and may request the smartphone 30B to download the assigned data file (Step S321).

The smartphone 30A may establish the communication connection to the server 100 based on the connection setting to the server 100 and may request the server 100 to transmit the assigned data file (Step S312). In response to the request from the smartphone 30A, the server 100 may transmit the assigned data file to the smartphone 30A (Step S313). In this way, the smartphone 30A may download the data file assigned in Step S310 from the server 100. Thereafter, the smartphone 30A may send the in-vehicle apparatus 10 the notification indicating that the assigned data file has been downloaded (Step S314).

Likewise, the smartphone 30B may establish the communication connection to the server 100 based on the connection setting to the server 100 and may request the server 100 to transmit the assigned data file (Step S322). In response to the request from the smartphone 30B, the server 100 may transmit the assigned data file to the smartphone 30B (Step S323). In this way, the smartphone 30B may download the data file assigned in Step S310 from the server 100. Thereafter, the smartphone 30B may send the in-vehicle apparatus 10 the notification indicating that the assigned data file has been downloaded (Step S324).

The communication system 1 may repeat the process described above until the smartphones 30A and 30B download all the data files included in the updating software (see Steps S315 and S325, for example). When the communication speed of the smartphone 30A is higher than that of the smartphone 30B in this process, for example, a data file having a large file size may be assigned to the smartphone 30A, and a data file having a small file size may be assigned to the smartphone 30B. Accordingly, the smartphone 30A may download the data file having the large file size, and the smartphone 30B may download the data file having the small file size, for example.

Thereafter, the download control unit 25 of the in-vehicle apparatus 10 may confirm that the smartphones 30A and 30B have downloaded all the data files included in the updating software (Step S331).

Thereafter, the download control unit 25 may request the smartphone 30A to transfer all the downloaded data files (step S332). In response to the request from the in-vehicle apparatus 10, the smartphone 30A may transfer all the downloaded data files to the in-vehicle apparatus 10 (Step S333). The communicator 11 of the in-vehicle apparatus 10 may receive these data files.

Likewise, the download control unit 25 may request the smartphone 30B to transfer all the downloaded data files (Step S334). In response to the request from the in-vehicle apparatus 10, the smartphone 30B may transfer all the downloaded data files to the in-vehicle apparatus 10 (Step S335). The communicator 11 of the in-vehicle apparatus 10 may receive these data files.

Thereafter, the update processing unit 26 of the in-vehicle apparatus 10 may update the software used in the in-vehicle apparatus 10 by performing the installation operation based on the data files transferred from the smartphones 30A and 30B (Step S336).

Thereafter, the process may be terminated. In one embodiment, the smartphone 30A may serve as the "first portable device". In one embodiment, the smartphone 30B may serve as a "second portable device".

Described next is Case C3 in which two smartphones 30 (smartphones 30A and 30B) establish the communication connection to the in-vehicle apparatus 10. In this example, the smartphone 30A may establish the communication connection first, following which the smartphone 30B may establish the communication connection.

Figure 7A:
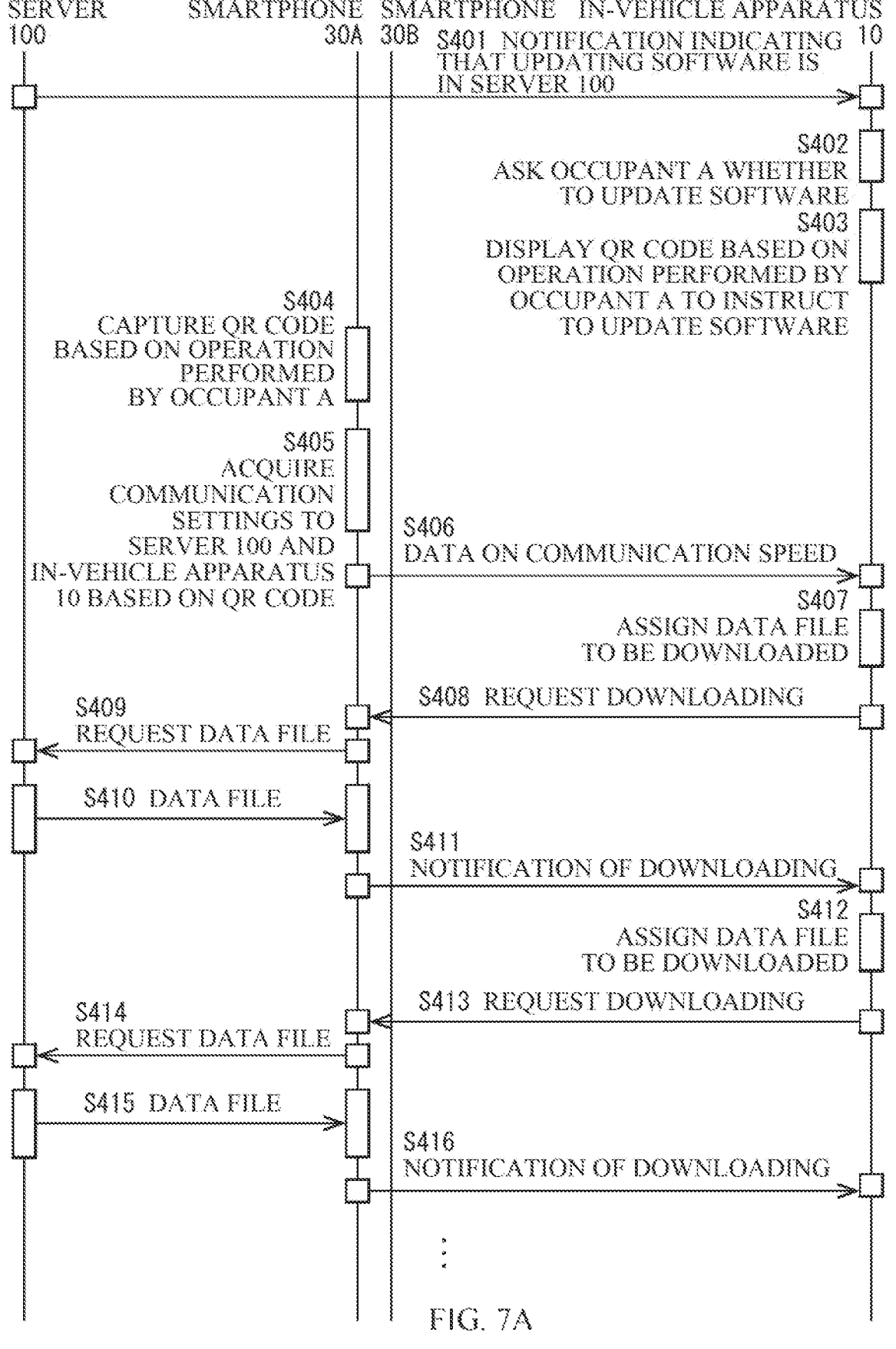
FIG. 7A is another sequence diagram illustrating an exemplary operation of the communication system illustrated in FIG. 1.
Figure 7B:
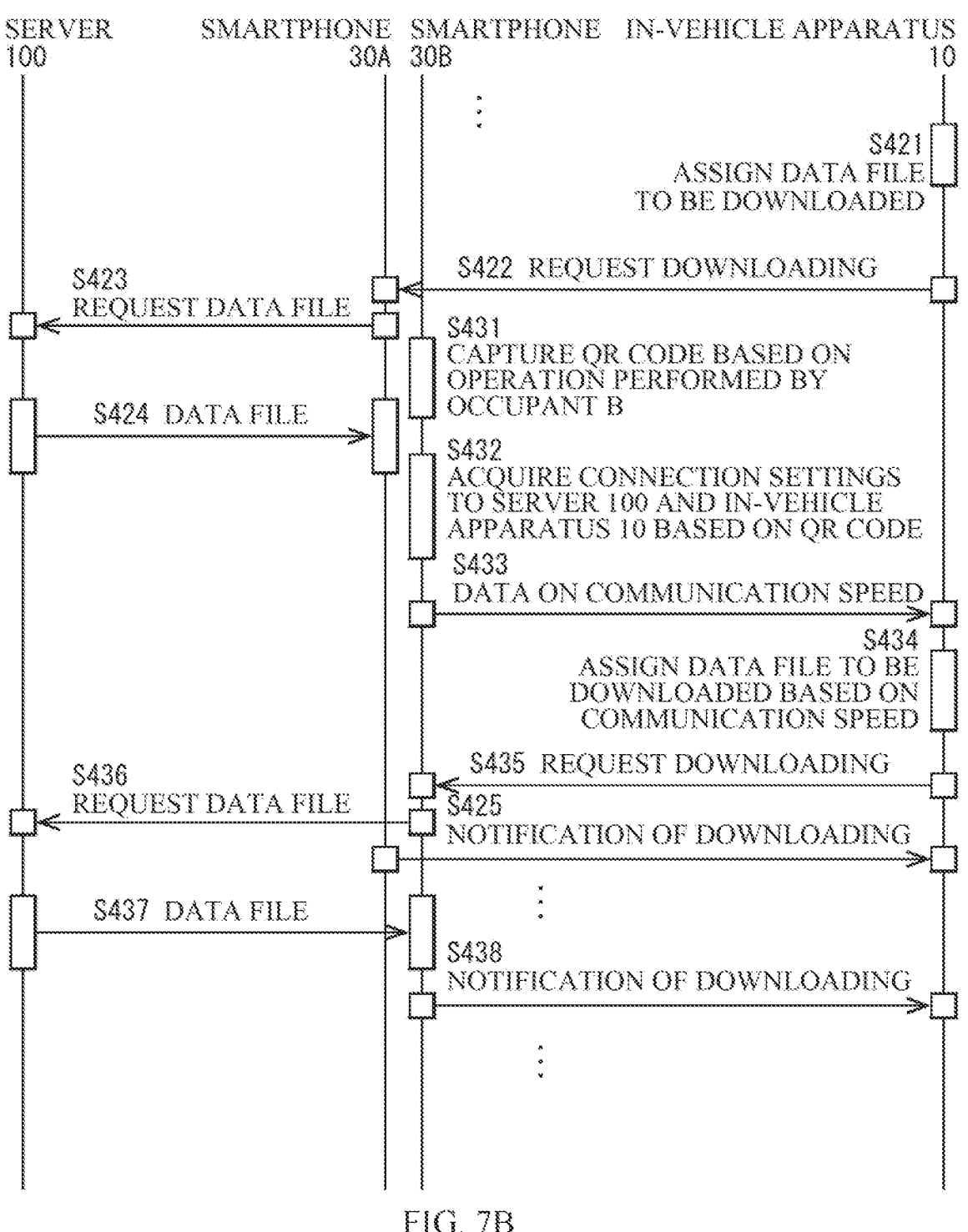
FIG. 7B is another sequence diagram illustrating an exemplary operation of the communication system illustrated in FIG. 1.

FIGS. 7A and 7B each illustrate an exemplary operation of the communication system 1 in Case C3.

First, when the software used in the vehicle 9 is upgraded, for example, the server 100 may send the in-vehicle apparatus 10 the notification indicating that the updating software is in the server 100 (Step S401). The communicator 11 of the in-vehicle apparatus 10 may receive the notification indicating that the updating software is in the server 100, and the update confirmation unit 22 may confirm that the notification has been received.

Next, based on the command from the update confirmation unit 22, the display 12 of the in-vehicle apparatus 10 may display the message asking the occupant A whether to update the software used in the in-vehicle apparatus 10 (Step S402). In this example, the occupant A may perform the operation instructing to update the software using the operation input unit 13 of the in-vehicle apparatus 10. Based on the operation performed by the occupant A to instruct to update the software, the QR code generation unit 23 of the in-vehicle apparatus 10 may generate a QR code, and the display 12 may display the QR code (Step S403).

Based on the operation performed by the occupant A using the touch panel 32 of the smartphone 30A, and the imager 34 of the smartphone 30A may capture the QR code displayed on the display 12 of the in-vehicle apparatus 10 (Step S404). Based on the captured QR code, the processor 35 of the smartphone 30A may acquire the connection setting to the server 100 and the connection setting to the in-vehicle apparatus 10 (Step S405). Thereafter, the communicator 31 of the smartphone 30A may establish the communication connection to the in-vehicle apparatus 10 based on the connection setting to the in-vehicle apparatus 10, and may send the data on the communication speed of the smartphone 30A in the communication with the server 100 (Step S406). The communicator 11 of the in-vehicle apparatus 10 may receive the data on the communication speed. The communication connection management unit 24 may manage the smartphone 30A in association with the communication speed of the smartphone 30A.

Next, the download control unit 25 of the in-vehicle apparatus 10 may assign one of the data files included in the updating software to the smartphone 30A (Step S407). Thereafter, the in-vehicle apparatus 10 may request the smartphone 30A to download the assigned data file (Step S408).

The smartphone 30A may establish the communication connection to the server 100 based on the connection setting to the server 100 and may request the server 100 to transmit the assigned data file (Step S409). In response to the request from the smartphone 30A, the server 100 may transmit the assigned data file to the smartphone 30A (Step S410). In this way, the smartphone 30A may download the data file assigned in Step S407 from the server 100. Thereafter, the smartphone 30A may send the in-vehicle apparatus 10 the notification indicating that the assigned data file has been downloaded (Step S411).

In this example, the communication system 1 may repeat the process including Step S407 to Step S411 (see Step S412 to Step S416, for example).

For example, the download control unit 25 of the in-vehicle apparatus 10 may assign one of the data files included in the updating software to the smartphone 30A (Step S421). Thereafter, the in-vehicle apparatus 10 may request the smartphone 30A to download the assigned data file (Step S422). The smartphone 30A may establish the communication connection to the server 100 based on the connection setting to the server 100 and may request the server 100 to transmit the assigned data file (Step S423). In response to the request from the smartphone 30A, the server 100 may transmit the assigned data file to the smartphone 30A (Step S424). Thereafter, the smartphone 30A may send the in-vehicle apparatus 10 the notification indicating that the assigned data file has been downloaded (Step S425).

In this example, the occupant B may start operating the smartphone 30B when the smartphone 30A is downloading the data file in Step S424. Based on the operation performed by the occupant B using the touch panel 32 of the smartphone 30B, the imager 34 of the smartphone 30B may capture the QR code displayed on the display 12 of the in-vehicle apparatus 10 (Step S431). Based on the captured QR code, the processor 35 of the smartphone 30B may acquire the connection setting to the server 100 and the connection setting to the in-vehicle apparatus 10 (Step S432). Thereafter, the communicator 31 of the smartphone 30B may establish the communication connection to the in-vehicle apparatus 10 based on the connection setting to the in-vehicle apparatus 10, and may send the data on the communication speed of the smartphone 30B in the communication with the server 100 (Step S433). The communicator 11 of the in-vehicle apparatus 10 may receive the data on the communication speed. The communication connection management unit 24 may manage the smartphone 30B in association with the communication speed of the smartphone 30B.

Next, the download control unit 25 of the in-vehicle apparatus 10 may assign one of the data files included in the updating software to the smartphone 30B based on the communication speeds of the smartphone 30A and the smartphone 30B (Step S434). When the communication speed of the smartphone 30B is lower than that of the smartphone 30A, for example, the download control unit 25 may assign a data file having a small file size to the smartphone 30B. Thereafter, the in-vehicle apparatus 10 may request the smartphone 30B to download the assigned data file (Step S435).

The smartphone 30B may establish the communication connection to the server 100 based on the connection setting to the server 100 and may request the server 100 to transmit the assigned data file (Step S436). In response to the request from the smartphone 30B, the server 100 may transmit the assigned data file to the smartphone 30B (Step S437). In this way, the smartphone 30B may download the data file assigned in Step S434 from the server 100. Thereafter, the smartphone 30B may send the in-vehicle apparatus 10 the notification indicating that the assigned data file has been downloaded (Step S438).

The communication system 1 may repeat the process described above. When the communication speed of the smartphone 30A is higher than that of the smartphone 30B in this process, for example, a data file having a large file size may be assigned to the smartphone 30A, and a data file having a small file size may be assigned to the smartphone 30B. Accordingly, the smartphone 30A may download the data file having the large file size, and the smartphone 30B may download the data file having the small file size, for example.

Thereafter, the download control unit 25 of the in-vehicle apparatus 10 may confirm that the smartphones 30A and 30B have downloaded all the data files included in the updating software (Step S441).

Thereafter, the download control unit 25 may request the smartphone 30A to transfer all the downloaded data files (Step S442). In response to the request from the in-vehicle apparatus 10, the smartphone 30A may transfer all the downloaded data files to the in-vehicle apparatus 10 (Step S443). The communicator 11 of the in-vehicle apparatus 10 may receive these data files.

Likewise, the download control unit 25 may request the smartphone 30B to transfer all the downloaded data files (Step S444). In response to the request from the in-vehicle apparatus 10, the smartphone 30B may transfer all the downloaded data files to the in-vehicle apparatus 10 (Step S445). The communicator 11 of the in-vehicle apparatus 10 may receive these data files.

Thereafter, the update processing unit 26 of the in-vehicle apparatus 10 may update the software used in the in-vehicle apparatus 10 by performing the installation operation based on the data files transferred from the smartphones 30A and 30B (Step S446).

Thereafter, the process may be terminated. In one embodiment, the smartphone 30A may serve as the "first portable device". In one embodiment, the smartphone 30B may serve as the "second portable device".

As described above, the in-vehicle apparatus 10 includes the communicator 11, the display 12, and the processor 20. The communicator 11 is configured to communicate with the first portable device (smartphone 30A). The display 12 is configured to display the QR code including the data indicating the connection setting to the server 100. In one embodiment, the data indicating the connection setting to the server 100 may serve as "first setting data". The processor 20 is configured to request the first portable device (smartphone 30) communicably coupled to the communicator 11 to establish the communication connection to the server 100 based on the first setting data acquired by capturing the QR code and download the data file from the server 100. Accordingly, when the occupant wants to update the software used in the vehicle 9, the occupant may operate the smartphone 30A to cause the smartphone 30A to capture the QR code. That is, when the occupant wants to update the software used in the vehicle 9, the occupant may perform an explicit operation to cause the smartphone 30A to download the data file from the server 100. This prevents the communication between the smartphone 30A and the server 100 from being established at a timing unintended by the occupant. It is therefore possible to enhance the user convenience.

The use of the QR code in the in-vehicle apparatus 10 enables the occupant to communicably couple the smartphone 30A to the server 100 without manually inputting the URL of the server 100 or the username, for example. It is therefore possible to enhance the user convenience of the in-vehicle apparatus 10 in downloading the software.

The QR code generated in the in-vehicle apparatus 10 may further include the data indicating the connection setting to the communicator 11. In one embodiment, the data indicating the connection setting to the communicator 11 may serve as "second setting data". The processor 20 may be configured to request the first portable device (smartphone 30A) to establish the communication connection to the communicator 11 based on the second setting data acquired by capturing the QR code. This enables the occupant to communicably couple the smartphone 30 to the in-vehicle apparatus 10 without manually inputting the identifier of the in-vehicle apparatus 10, for example. It is therefore possible to enhance the user convenience of the in-vehicle apparatus 10.

Figure 7C:
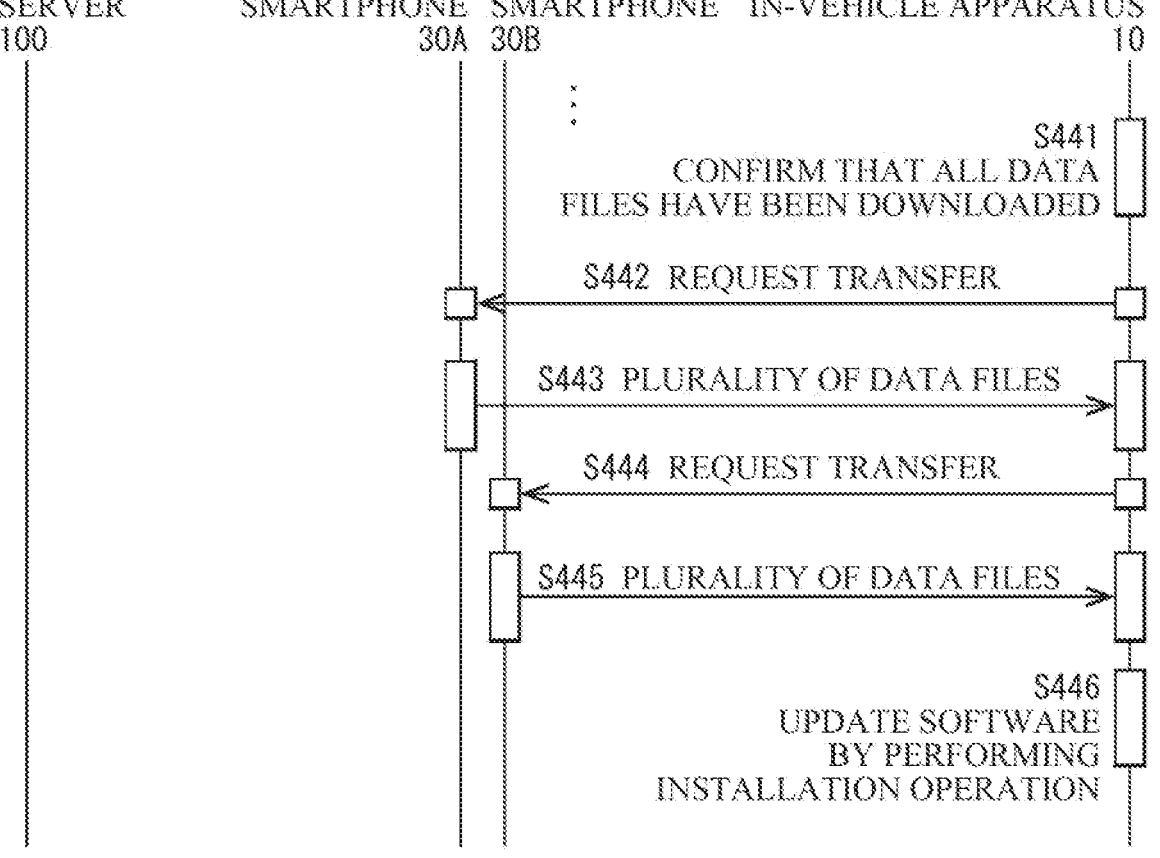
FIG. 7C is another sequence diagram illustrating an exemplary operation of the communication system illustrated in FIG. 1.

In addition, the communicator 11 of the in-vehicle apparatus 10 may be configured to communicate with the second portable device (smartphone 30B). Further, the processor 20 may be configured to request the second portable device (smartphone 30B) communicably coupled to the communicator 11 to establish the communication connection to the server 100 based on the first setting data acquired by capturing the pattern image and download the data file from the server 100. This enables the software to be downloaded by the multiple smartphones 30, for example. For instance, the QR code may be left displayed while the smartphone 30A is downloading the assigned data file, which enables the smartphone 30B to start downloading after the smartphone 30A starts downloading, as described in Case C3 with reference to FIGS. 7A to 7C, for example. The use of the multiple smartphones 30 reduces a processing load on each of the multiple smartphones 30, reducing the time to download the software. It is therefore possible to provide the in-vehicle apparatus 10 with enhanced user convenience.

The in-vehicle apparatus 10 may further include the operation input unit 13 that receives an operational input performed by the occupant of the vehicle 9. The communicator 11 may be configured to communicate with the server 100, and the display 12 may be configured to display the message asking the occupant whether to update the software when the communicator 11 receives, from the server 100, the notification indicating that the updating data file is in the server 100. When the operation input unit 13 receives an operational input indicating that the software is to be updated, the display 12 may display the QR code. Thus, when the occupant wants to update the software used in the vehicle 9, the occupant may perform an operational input instructing to update the software by operating the operation input unit 13 of the in-vehicle apparatus 10. That is, when the occupant wants to update the software used in the vehicle 9, the occupant may perform an explicit operation to cause the display 12 of the in-vehicle apparatus 10 to display the QR code. This prevents the QR code from being displayed when the occupant does not want to download the data file. It is therefore possible to enhance the user convenience.

Further, the communicator 11 in the in-vehicle apparatus 10 may be configured to receive the downloaded data file transmitted from the first portable device (smartphone 30A) communicatively coupled to the communicator 11. This enables the in-vehicle apparatus 10 to update the software based on the downloaded data file. It is therefore possible to enhance the user convenience.

According to the example embodiment described above, the in-vehicle apparatus 10 includes the communicator, the display, and the processor. The communicator is configured to communicate with the first portable device. The display is configured to display the QR code including the first setting data indicating the connection setting to the server. The processor is configured to request the first portable device communicably coupled to the communicator to establish the communication connection to the server based on the first setting data acquired by capturing the QR code and download the data file from the server. It is therefore possible to enhance the user convenience.

According to the example embodiment described above, the QR code may further include the second setting data indicating the connection setting to the communicator. The processor may be configured to request the first portable device to establish the communication connection to the communicator based on the second setting data acquired by capturing the QR code. It is therefore possible to enhance the user convenience.

According to the example embodiment described above, the communicator may be further configured to communicate with the second portable device. The processor may be further configured to request the second portable device communicably coupled to the communicator to establish the communication connection to the server based on the first setting data acquired by capturing the pattern image and download the data file from the server. It is therefore possible to enhance the user convenience.

According to the example embodiment described above, the in-vehicle apparatus may further include the operation input unit that receives an operational input performed by the occupant of the vehicle. The communicator may be configured to communicate with the server, and the display may be configured to display the message asking the occupant whether to update the software when the communicator receives, from the server, the notification indicating that the updating data file is in the server. Further, the display may be configured to display the QR code when the operation input unit receives an operational input indicating that the software is to be updated. It is therefore possible to enhance the user convenience.

According to the example embodiment described above, the communicator may be configured to receive the downloaded data file transmitted from the first portable device communicatively coupled to the communicator. It is therefore possible to enhance the user convenience.

Figure 8:
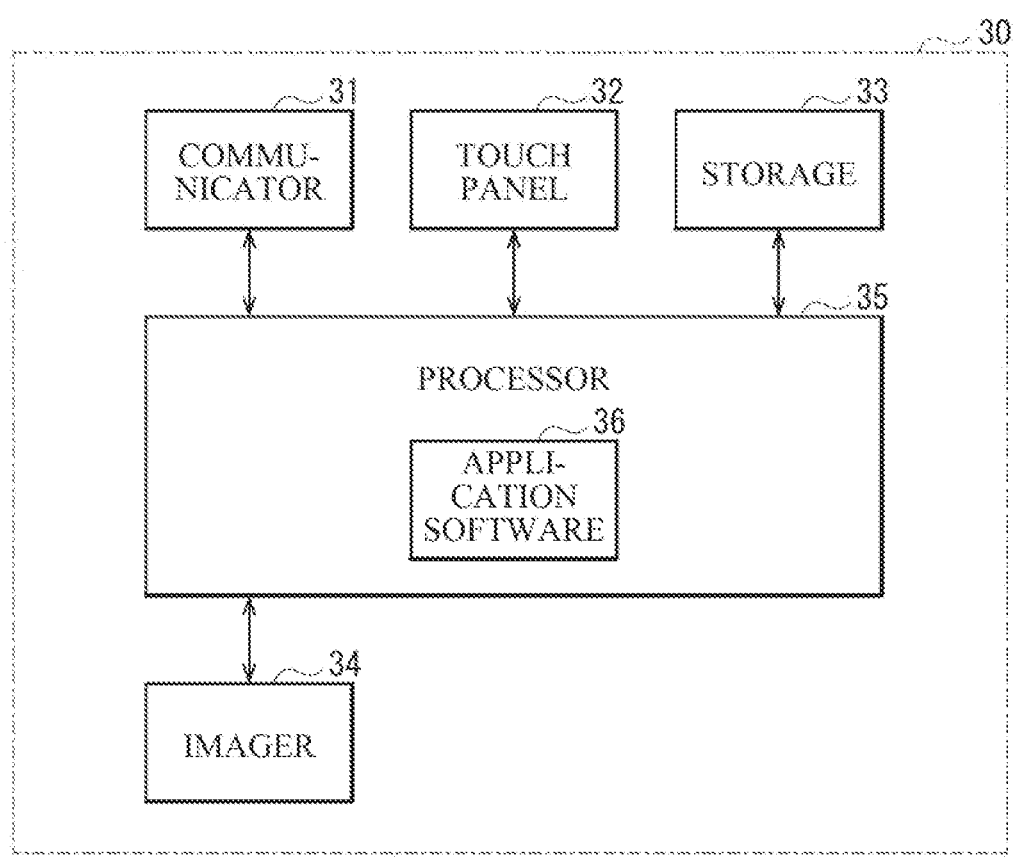
FIG. 8 is a block diagram illustrating a configuration example of a smartphone according to an example embodiment of the disclosure.

In the example embodiment described above, the smartphone 30 may capture the QR code, acquire the connection setting to the server 100 and the connection setting to the in-vehicle apparatus 10 based on the captured QR code, and establish the communication connection based on these connection settings; however, the disclosure is not limited thereto. For example, as illustrated in FIG. 8, the processor 35 may execute application software 36 installed in advance in the smartphone 30 to establish the communication connection based on the connection setting to the server 100 and the connection setting to the in-vehicle apparatus 10 that are set to the application software 36.

In Modification Example 1, the smartphone 30 may be configured to acquire the connection setting to the server 100 and the connection setting to the in-vehicle apparatus 10 by two methods. That is, when the QR code is displayed on the display 12 of the in-vehicle apparatus 10, the smartphone 30 may acquire the connection setting to the server 100 and the connection setting to the in-vehicle apparatus 10 by capturing the QR code based on the operation performed by the occupant, as in the example embodiment described above. Alternatively, the smartphone 30 may acquire the connection setting to the server 100 and the connection setting to the in-vehicle apparatus 10 by executing the application software 36 based on the operation performed by the occupant.

In the example embodiment described above, the processor 20 may control the travel of the vehicle 9; however, the disclosure is not limited thereto. Alternatively, the processor 20 may perform another process related to the vehicle 9. For example, the processor 20 may determine a route to a destination on which the vehicle 9 is to travel, and may perform a navigation process in which information on the route is provided to the driver who drives the vehicle 9. In this case, the in-vehicle apparatus 10 may be configured to update software related to the navigation process.

In the example embodiment described above, the QR code may include the data indicating the connection setting to the server 100 and the data indicating the connection setting to the in-vehicle apparatus 10; however, the disclosure is not limited thereto. Alternatively, the QR code may include, for example, the data indicating the connection setting to the server 100 and may not include the data indicating the connection setting to the in-vehicle apparatus 10. In this case, the occupant may communicably couple the smartphone 30 to the in-vehicle apparatus 10 by manually inputting the identifier of the in-vehicle apparatus 10, for example. For instance, the in-vehicle apparatus 10 may sequentially assign the respective data files included in the updating software to the smartphones 30 that have acquired the connection settings to the server 100 from the QR code among the one or more smartphones 30 communicably coupled to the in-vehicle apparatus 10.

OTHER MODIFICATION EXAMPLES

Further, two or more of the modification examples described above may be combined.

The disclosure has been described with reference to the example embodiments and the modification examples; however, the disclosure is not limited to the example embodiments and modification examples described above, and various modifications may be made.

For example, in the example embodiments and the modification examples described above, the QR code may be used; however, the disclosure is not limited thereto, and any pattern image may be used that includes the data indicating the connection setting to the server 100 and the data indicating the connection setting to the in-vehicle apparatus 10.

For example, in the example embodiments and the modification examples described above, the two smartphones 30 may be used in Cases C2 and C3; however, the disclosure is not limited thereto, and three or more smartphones may be used.

For example, in the example embodiments and the modification examples described above, the smartphones 30 may be used; however, the disclosure is not limited thereto, and various portable devices such as tablet devices may be used.

For example, the process illustrated in FIG. 4 is a mere example, and some of the steps in the process may be omitted, or additional steps may be added to the process.

The effects described herein are mere examples, and the effects of the disclosure are not limited to those described herein. Other effects may thus be obtained for the disclosure.

Further, the disclosure may have the following aspects.

(1) An in-vehicle apparatus to be applied to a vehicle, the in-vehicle apparatus including:

a communicator configured to communicate with a first portable device;

a display configured to display a pattern image including first setting data indicating a connection setting to a server; and a processor configured to request the first portable device communicably coupled to the communicator to establish a communication connection to the server based on the first setting data acquired by capturing the pattern image and download a data file from the server.

(2) The in-vehicle apparatus according to (1), in which the pattern image further includes second setting data indicating a connection setting to the communicator, and the processor is configured to request the first portable device to establish a communication connection to the communicator based on the second setting data acquired by capturing the pattern image.

(3) The in-vehicle apparatus according to (1), in which the communicator is further configured to communicate with a second portable device, and the processor is further configured to request the second portable device communicably coupled to the communicator to establish a communication connection to the server based on the first setting data acquired by capturing the pattern image and download a data file from the server.

(4) The in-vehicle apparatus according to (1), further including an operation input unit configured to receive an operational input performed by an occupant of the vehicle, in which the communicator is configured to communicate with the server, the display is configured to display a message asking the occupant whether to update software when the communicator receives, from the server, a notification indicating that the data file configured to update the software is in the server, and the display is configured to display the pattern image when the operation input unit receives an operational input indicating that the software is to be updated.

(5) The in-vehicle apparatus according to (1), in which the communicator is configured to receive the data file downloaded from the server and transmitted from the first portable device communicably coupled to the communicator.

According to the in-vehicle apparatus according to the example embodiments of the disclosure, it is possible to enhance the user convenience.

The invention claimed is:

1. An in-vehicle apparatus to be applied to a vehicle, the in-vehicle apparatus comprising:

a communicator configured to communicate with a first portable device and a second portable device;

a display; and a processor configured to:

generate a pattern image comprising first setting data indicating a connection setting to a server and second setting data indicating a connection setting to the communicator, cause the display to display the generated pattern image, request the first portable device communicably coupled to the communicator to acquire the pattern image by capturing the pattern image displayed on the display, request the first portable device to (i) establish a communication connection to the server based on the first setting data acquired by capturing the pattern image, and (ii) download a data file configured to update software of the in-vehicle apparatus from the server, request the first portable device to (i) establish a communication connection to the communicator based on the second setting data acquired by capturing the pattern image, and (ii) transmit the data file downloaded from the server to the communicator;

request the second portable device communicably coupled to the communicator to acquire the pattern image by capturing the pattern image displayed on the display, request the second portable device to (i) establish a communication connection to the server based on the first setting data acquired by capturing the pattern image, and (ii) download another data file configured to update the software of the in-vehicle apparatus from the server, the update of the software of the in-vehicle apparatus comprising the data file and the another data file, the another data file being different from the data file downloaded by the first portable device, and request the second portable device to (i) establish a communication connection to the communicator based on the second setting data acquired by capturing the pattern image, and (ii) transmit the another data file downloaded from the server to the communicator.

2. The in-vehicle apparatus according to claim 1, further comprising an operation input unit configured to receive an operational input performed by an occupant of the vehicle, wherein the communicator is configured to communicate with the server, the display is configured to display a message asking the occupant whether to update software when the communicator receives, from the server, a notification indicating that the data file configured to update the software is in the server, and the display is configured to display the pattern image when the operation input unit receives an operational input indicating that the software is to be updated.

3. The in-vehicle apparatus according to claim 1, wherein the communicator is configured to receive the data file downloaded from the server and transmitted from the first portable device communicably coupled to the communicator.

4. The in-vehicle apparatus according to claim 1, wherein the first setting data comprises a network address of the server and authentication information for accessing the server, and the second setting data comprises identification information of the communicator and an access key for establishing the communication connection to the communicator.

5. The in-vehicle apparatus according to claim 1, wherein the processor is configured to update the software of the in-vehicle apparatus based on the data file and the another data file.

6. The in-vehicle apparatus according to claim 1, wherein the processor is configured to:

obtain a first communication speed indicating a speed in the communication connection between the first portable device and the server, and a second communication speed indicating a speed in the communication connection between the second portable device and the server, and assign the data file and the another data file to the first portable device and the second portable device based on the first communication speed and the second communication speed.

7. The in-vehicle apparatus according to claim 6, wherein the processor is configured to:

receive the first communication speed from the first portable device, and receive the second communication speed from the second portable device.

8. The in-vehicle apparatus according to claim 6, wherein the processor is configured to:

estimate the first communication speed based on a standard of wireless communication used for the communication between the first portable device and the server, and estimate the second communication speed based on a standard of wireless communication used for the communication between the second portable device and the server.

9. The in-vehicle apparatus according to claim 1, wherein the pattern image is a two-dimensional code.

10. The in-vehicle apparatus according to claim 9, wherein the two-dimensional code is a quick response (QR) code.

11. The in-vehicle apparatus according to claim 1, wherein the communicator is configured to communicate with the first portable device via a wireless local area network.

12. The in-vehicle apparatus according to claim 1, wherein the first portable device is a smartphone.

* * * * *